Feb. 18, 1930.   B. A. SLOCUM   1,747,328
FILM SHIFTING DEVICE FOR CAMERAS
Filed Sept. 21, 1927
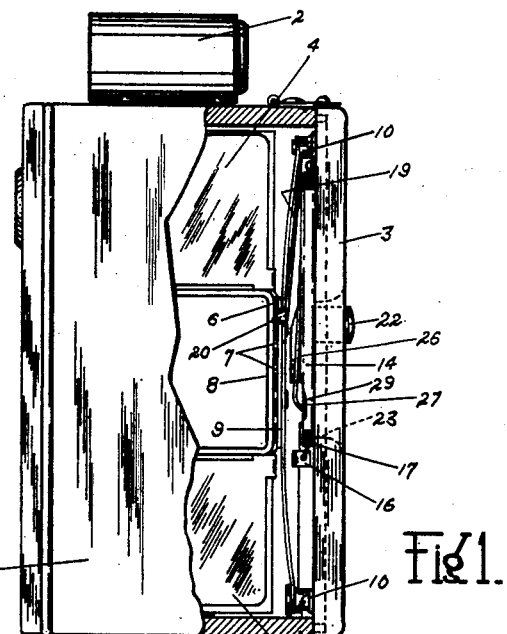
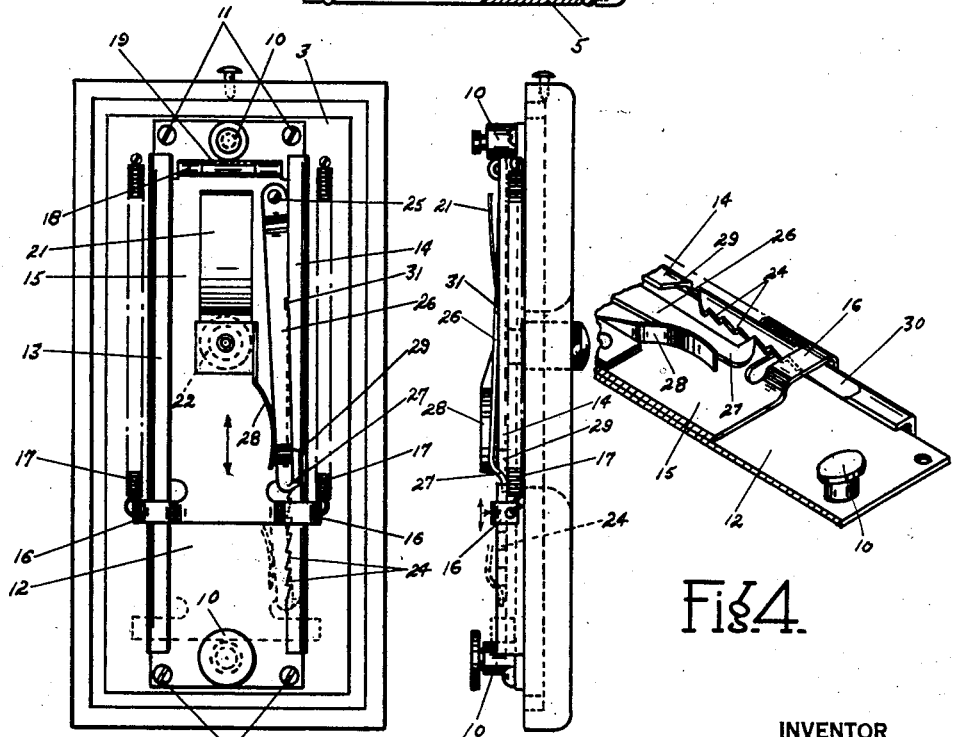
INVENTOR
BENJAMIN A. SLOCUM.
ATTORNEY Patented Feb. 18, 1930

1,747,328

UNITED STATES PATENT OFFICE

BENJAMIN A. SLOCUM, OF BINGHAMTON, NEW YORK, ASSIGNOR, BY MESNE ASSIGN-
MENTS, TO AGFA ANSCO CORPORATION, OF BINGHAMTON, NEW YORK, A CORPORA-
TION OF NEW YORK

FILM-SHIFTING DEVICE FOR CAMERAS

Application filed September 21, 1927. Serial No. 221,027.

My invention relates generally to a means for shifting photographic film from one film chamber to another in a camera past an exposure opening, and has particular reference to a shifting means which insures a complete movement of the film for each exposure at each stroke of the shifter.

The primary object of my invention is to provide such a shifting device which will not return to normal position for the next operation until after the first shifting operation has been completed. In other words, with my device, unless the film is moved the full distance, when the shifter is operated, said shifter will not return to position for the next operation.

Other objects and advantages in details of construction and operation will be apparent as the description proceeds, reference now being had to the figures of the drawing wherein like reference numerals indicate like parts.

In the drawing:—

Figure 1 is a side view of the camera equipped with my invention, certain parts being broken away for clearness.

Figure 2 is a plan view of the inner surface of the back of the camera, upon which my improved film shifter is mounted.

Figure 3 is a side view thereof.

Figure 4 is a detail illustrating the operation of the shifter catch.

A photographic camera is indicated at 1, and is provided with the usual view finder 2, and with the removable back 3, on the inner surface of which my improved film shifting mechanism is mounted. 4 represents the film supply cartridge and 5 the film take up cartridge. The film is indicated at 6 passing downwardly from the supply cartridge 4 to the take up cartridge 5, and in this instance, a strip of film having perforations 7, such as is common in motion picture film. After the film 6 is moved downwardly, it passes the exposure station 8 in engagement with which it is held by means of the leaf spring 9 anchored at either end to the posts 10 carried by the back 3.

Secured to the back 3 as by the screws 11 is a plate 12, the edges of which are turned upwardly and inwardly to form the guide flanges 13 and 14 receiving the edges of the slidable plate 15, the lower end of which is provided with extensions 16 secured to which are one end of the coil springs 17 anchored at their opposite ends to the back 3 whereby to normally pull the slide 15 upward to the position shown in Figure 2. The upper end of the slide 15 is provided with a hinge 18 to which is pivoted a claw member 19, the free end of which is provided with teeth 20 for engagement with the perforations 7 in the film 6. This claw 19 is normally urged into film engaging position by means of the flat leaf spring 21 secured to the slide 15. The slide 15 is provided with a finger piece 22 projecting outwardly through a slot 23 in the back 3 whereby the operator may move the slide downwardly to shift the film when the back 3 is in position on the camera. The slide 15 is of sufficent length to close the slot 23 at all times to prevent leakage of light therethrough. From the construction just described, it will be clear that upon downward movement of the slide 15 by means of the finger piece 22, the claw 19 will shift the film 6 downwardly and upon release of the finger piece 22, the springs 17 will return the slide upwardly ready for the next shifting operation.

In order to prevent the upward return of the claw 19 until after it has completed its full downward stroke to make a complete shift of the film, the following mechanism is provided. The guide flange 14 is provided adjacent its lower end with the teeth 24 cut in the inner edge thereof. Pivoted to the slide 15 as at 25 is a spring arm 26, the free end of which is provided with a pawl 27 adapted to engage with the teeth 24. A leaf spring 28 normally urges the pawl 27 into such engagement. The guide flange 14 is cut away as at 29 directly above the teeth 24 and at the lower end of the teeth 24 said flange is cut down to a thin knife edge as at 30.

The parts are shown in their normal position in Figure 2 wherein the pawl 27 lies within the cut out portion 29 in readiness to ratchet downwardly over the bevelled edges of the teeth 24 upon the downward movement of the slide 15. Upon the completion of the downward stroke, however, the pawl 27 slips over the thin edge 30 of the guide flange due to the pressure of the spring 28, and upon the return stroke upwardly of the slide 15, the pawl 27 slides over the upper surface of the guide flange until the return stroke is completed, whereupon the pawl falls into the cutout portion 29 ready for the next shifting movement. If, however, the operator should fail to complete the downward movement of the shifter, the pawl 27 engaging with the teeth 24 will hold the slide against return upward movement against the tension of the coil springs 17. The operator therefore is made aware of the fact that a complete shift of the film has not been accomplished and by further downward pressure on the finger piece 22 may complete the shift whereupon the slide is free to return to normal position in the manner just described. The resilient arm 26 is provided intermediate its ends with a downwardly struck tongue 31 adapted to engage with the edge of the guide flange 14 to prevent too great a lateral movement of the arm 26 and pawl 27.

Of course, many changes may be made in details of construction and operation without departing from the spirit and scope of my invention. I do not limit myself therefore to the exact structure shown and described other than by the appended claims.

I claim:

1. In combination a camera, a reciprocating film shifter, means for moving said shifter in one direction, means for returning said shifter to starting position, and means for preventing the return of said shifter before completion of the first named movement comprising a pawl and ratchet device cooperating between said shifter and a stationary part of said camera.

2. In combination, a camera, a reciprocating film shifter comprising a slide carrying film engaging means to move a film in one direction, a guideway for said slide, and a pawl on said slide cooperating with teeth on said guideway for locking said slide against return movement in certain positions of said slide.

3. In combination, a camera, a reciprocating film shifter comprising a slide carrying film engaging means to move a film in one direction, a guideway for said slide, a pivoted pawl on said slide, teeth in one edge of said guideway, manual means for moving said slide in one direction to move said film, means normally urging the return of said slide in the opposite direction, said pawl and teeth cooperating to prevent the return of said slide prior to the completion of said first named movement.

4. In combination, a camera, a reciprocating film shifter comprising a slide carrying film engaging means to move a film in one direction, manual means for moving said slide in one direction, means for automatically returning said slide in the opposite direction, a guideway for said slide, teeth on a portion of said guideway, a pivoted pawl on said slide normally urged to engagement with said teeth, said pawl riding on said teeth during the manually operated movement of said slide and preventing the return of said slide before the completion of said manual movement and means at the end of such movement disengaging said pawl from said teeth whereby to permit said automatic return of said slide.

BENJAMIN A. SLOCUM.